United States Patent [19]

Hutson et al.

[11] 3,919,534

[45] Nov. 11, 1975

[54] DATA PROCESSING SYSTEM

[75] Inventors: Maurice L. Hutson; Kurt Erben, both of St. Paul, Minn.

[73] Assignee: Control Data Corporation, Minneapolis, Minn.

[22] Filed: May 17, 1974

[21] Appl. No.: 470,896

[52] U.S. Cl. ................ 235/156; 235/164; 235/168; 340/172.5

[51] Int. Cl.² ............................................ G06F 7/38

[58] Field of Search ........ 179/15 AV; 235/156, 164, 235/168; 340/172.5

[56] References Cited

UNITED STATES PATENTS

| | | | |
|---|---|---|---|
| 3,289,169 | 11/1966 | Marosz | 340/172.5 |
| 3,346,727 | 10/1967 | Lethin et al. | 340/172.5 |
| 3,646,524 | 2/1972 | Clark et al. | 340/172.5 |
| 3,728,684 | 4/1973 | Morganti | 340/172.5 |

*Primary Examiner*—R. Stephen Dildine, Jr.

*Attorney, Agent, or Firm*—Robert M. Angus; Joseph A. Genovese

[57] ABSTRACT

Apparatus is provided for processing sparse vectors between the memory and calculator portions of a computer. First and second sparse vectors, each containing operands corresponding to non-zero terms of a respective operand vector, are processed to an aligning means which aligns the operands of the vectors on a first-in basis. First and second order vectors, each containing bits whose binary ones may correspond to the non-zero terms of the respective operand vector and whose binary zeros may correspond to the zero-valued terms of the respective operand vector, are processed through logic apparatus to selectively gate the aligning means to process an operand from a sparse vector whenever a binary one bit appears in a corresponding order vector. The first and second order vectors may also be utilized to generate a third order vector for a resultant sparse vector.

30 Claims, 6 Drawing Figures

FIG. 5 (ADD/SUBTRACT)

FIG. 6 (MULT./DIVIDE)

DATA PROCESSING SYSTEM

This invention relates to vector handling apparatus, and particularly to apparatus for processing data and information between various portions of a computer.

In the data processing art, it is often desirable to move relatively large quantities of data between portions of a computer in the shortest amount of time. It is common in computer operations to perform vector operations in which individual ones of a plurality of operands representing one operand vector are sequentially processed with individual ones of a plurality of operands representing another operand vector. Each operand vector may comprise a large number of individual operands, several thousands of such operands not being unusual for a single operand vector. It often occurs that some of the operands of such operand vector have a predetermined value, for example, zero. The present invention is directed to apparatus for processing vectors wherein operands having such predetermined value are omitted so that valuable memory space is not utilized in storing operands of a vector of such predetermined value, e.g. zero. Further, where vectors contain a large number of operands having such zero value, a savings of computation time may be realized by not performing arithmetic operations upon such operands.

As used herein, the term "operand vector" means a vector comprising a plurality of operands arranged in a consecutively ordered stream; the term "resultant vector" means a vector comprising a plurality of resultants arranged in a consecutively ordered stream; the terms "operand sparse vector" and "resultant sparse vector" mean vectors comprising a plurality of operands or resultants (as the case may be) arranged in a consecutive stream, but differing from a corresponding operand or resultant vector by the omission of all operands or resultants representative of some predetermined value, e.g. zero; and the terms "operand order vector" and "resulant order vector" mean consecutively ordered bit streams whose ones each represent a predetermined condition of a corresponding operand or resultant vector and whose zeros each represent a different predetermined condition of a corresponding operand or resultant of a vector. In the examples given herein, a sparse vector contains all non-zero terms of a corresponding operand or resultant vector, and an order vector contains ones corresponding to the non-zero terms of the operand or resultant vector and zeros corresponding to the terms having a value of zero in the operand or resultant vector.

Heretofore, vector operations within a computer were accomplished by storing the entirety of each of a plurality of operand vectors in a computer memory (including those operands having a predetermined, e.g. zero, value), and processing all operands of the operand vectors through the arithmetic and control portions of the computer (usually through a data interchange). It can be appreciated that in cases where an operand represents a predetermined value (e.g. zero) valuable memory space can be saved by not storing those operands. Instead of storing and processing such operands, an order bit may be stored representative of the condition or value of each operand, and the order bits may be processed. For example, in the case of 64-bit operands in an operand vector, if only five percent of such operands have such predetermined (e.g. zero) value, the storage of an order vector may result in a savings of memory space. Thus, if an operand vector contains ten thousand operands and five percent of such operands (representing 500 operands or 32,000 bits) represent zero values, the storage of a ten thousand bit order vector, instead of the 32,000 bits of the 500 zero-value operands, results in a substantial savings of memory. Further, much valuable computation time may be needlessly wasted in processing vectors having large number of operands of zero value because the resultants may, at least in part, be dictated by the zero-valued operands. The present invention is concerned particularly with apparatus for processing sparse vectors to enable storage of sparse vectors (instead of the full vector) and for handling sparse vectors for arithmetic and control purposes.

Particularly, it is an object of the present invention to provide apparatus for processing sparse vectors between the memory and calculator portions of the computer.

It is another object of the present invention to provide apparatus for processing sparse vectors wherein an order vector is provided for controlling operation of the computer on the sparse vectors.

In accordance with the present invention, order vectors having bits representative of a predetermined value of each term of an operand vector are processed to selectively gate registers passing sparse vectors. The sparse vectors are forwarded to the registers and the operands thereof are sequentially gated in accordance with controls provided by the order vectors, the operand sparse vectors being processed by the computer to form resultant sparse vectors.

According to one feature of the present invention, the order vectors selectively gate the registers to align operands of two operand sparse vectors for subsequent processing by the computer.

According to another feature of the present invention, apparatus is provided for processing the order vectors in such a manner that resultant sparse vectors formed from the operand sparse vectors are selectively gated in accordance with the logic control of the order vectors.

According to another feature of the present invention, apparatus is provided for generating a resultant order vector so that the resultant order vector and the resultant sparse vector may be stored in memory in a condensed fashion.

The above and other features of this invention will be more fully understood from the following detailed description and the accompanying drawings, in which:

FIGS. 4 through 6 are representations of order and sparse vectors useful in explaining the operation of the apparatus shown in FIGS. 1 through 3.

Figure 1:
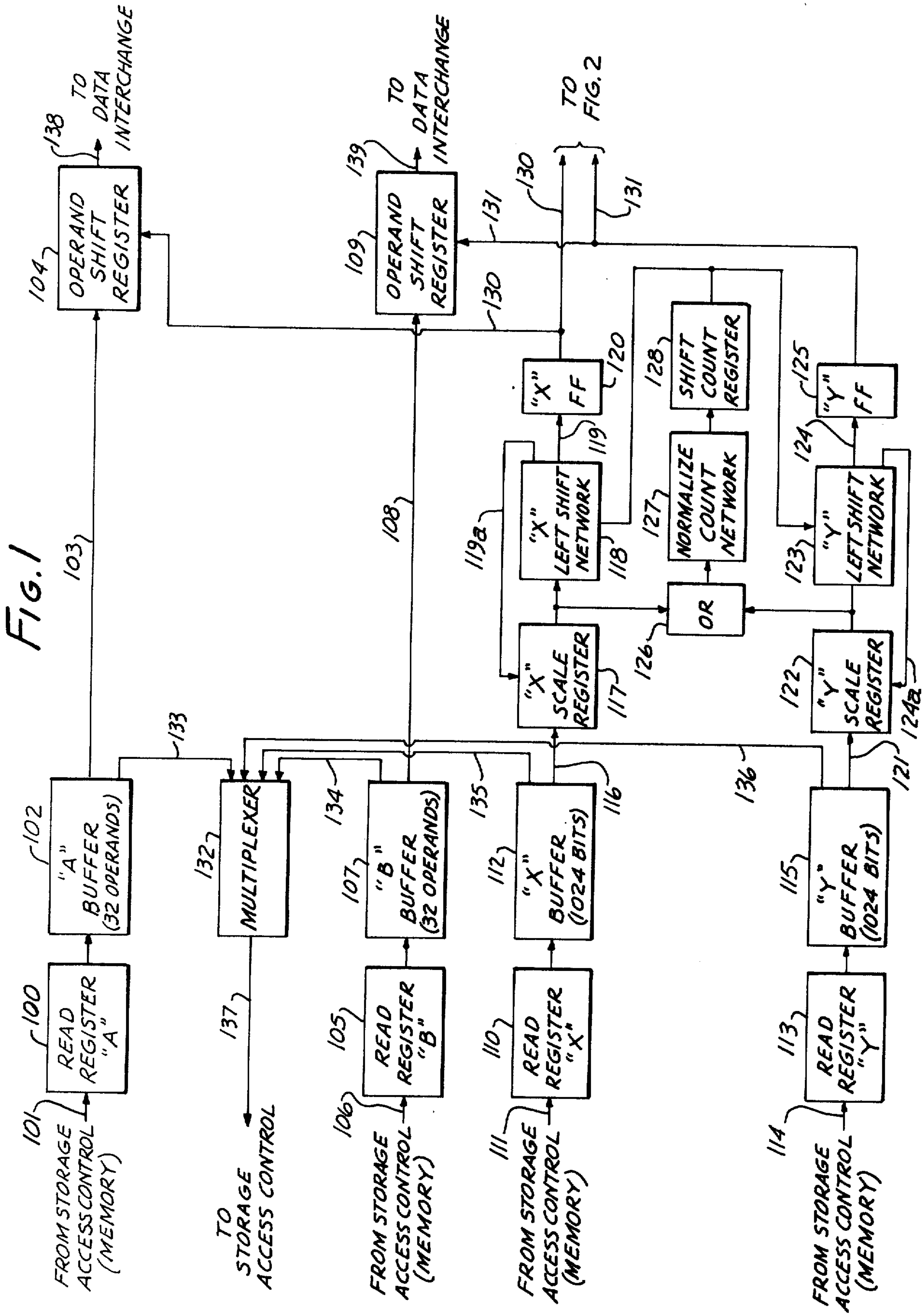
FIG. 1 is a block circuit diagram of apparatus for processing operand sparse vectors and operand order vectors in accordance with the presently preferred embodiment of the present invention.

With reference to the drawings, and particularly to FIG. 1, there is illustrated apparatus for processing operand sparse vectors in accordance with the presently preferred embodiment of the present invention. The apparatus illustrated in FIG. 1 comprises a read register 100 for receiving an A operand sparse vector from the storage access control and memory of a computer via channel 101. Read register 100 provides an output to buffer 102 which in turn provides an output via channel 103 to operand shift register 104. Similarly, read register 105 receives a B operand sparse vector via channel 106 from the storage access control and memory of the computer and provides an output to buffer 107 which in turn provides an output via channel 108 to operand shift register 109. Buffers 102 and 107 preferably have a capacity of up to 32 operands, and serve to align operands arriving via channels 101 and 106 in an aligned consecutively ordered operand stream, on a first-in first-out basis. The details of the apparatus for alignment of the operands as accomplished by buffers 102 and 107 are more fully explained in the copending application of M. L. Hutson and L. R. Bethany, Ser. No. 450,632 filed Mar. 13, 1974 for "Data Processing Apparatus, now U.S. Pat. No. 3,898,626 granted Aug. 5, 1975."

Read register 110 receives an input via channel 111 from the storage access control and memory of the computer and provides an output to buffer 112. Similarly, read register 113 receives an input via channel 114 from the storage access control and memory of the computer and provides an output to buffer 115. As will be more fully understood hereinafter, the A operand sparse vector is channelled from the memory via channel 101 to read register 100, the B operand sparse vector is channelled from the memory via channel 106 to read register 105, an X operand order vector is forwarded from memory via channel 111 to read register 110, and a Y operand order vector is channelled from memory via channel 114 to read register 113. Also, as will be more fully explained hereinafter, the X and Y order vectors contain the same number of bits as there are operands in the A and B operand vectors, respectively, and that each binary "1" bit in the X and Y order vectors corresponds to a non-zero operand of the respective A and B operand vectors, whereas each binary "0" bit is the X and Y order vectors corresponds to a zero-valued operand of the respective A and B operand vectors. It is to be understood, however, that the inputs received by read registers 100 and 105 do not contain the zero-valued operands (because they are sparse vectors). However, the position of zero-valued operands are denoted by 0 bits in the corresponding order vector.

Buffers 112 and 115 are capable of storing up to 1,024 bits. The output of buffer 112 is taken via channel 116 to X scale register 117 which in turn provides an output to X left-shift network 118 which in turn provides an output via channel 119 to X flip-flop 120. Similarly, buffer 115 provides an output via channel 121 to Y scale register 122 which in turn provides an output to Y left-shift network 123 which in turn provides an output via channel 124 to Y flip-flop 125. The output of register 117 and 122 are also inputted to OR gate 126 which in turn provides an output to normalize count network 127 which in turn provides an output to shift count register 128. The output from shift count register 128 is provided to both left-shift networks 118 and 123. Left shift network 118 provides an output via channel 119a to X scale register 117 while Y left-shift network provides an output via channel 124*a* to Y scale register 122.

An output is taken from X flip-flop 120 via channel

130 to operand shift register 104 while an output from Y flip-flop 125 is taken via channel 131 to operand shift register 109. Also, an output from X flip-flop 120 is taken via channel 130 to the apparatus shown in FIG. 2 while an output from flip-flop 125 is taken via channel 131, also to the apparatus illustrated in FIG. 2. Multiplexer 132 receives inputs via channel 133 from buffer 102, channel 134 from buffer 107, channel 135 from buffer 112 and channel 136 from buffer 115. Multiplexer 132 provides an output via channel 137 to the storage access control for purposes to be more fully explained hereinafter.

In operation of the apparatus thus far described, A operands of the A operand sparse vector are received from memory via channel 101 and are stored in buffer 102. The A vector comprises a plurality of A operands, e.g. $A_1, A_2, A_7, A_8, \ldots A_n$, each representing a non-zero value. Similarly, B operands of the B operand sparse vector ($B_1$–$B_m$)are received from memory and buffered in buffer 107. Buffers 102 and 107 align the received operands in consecutive order as is more fully explained in the aforementioned copending application.

Figure 4:
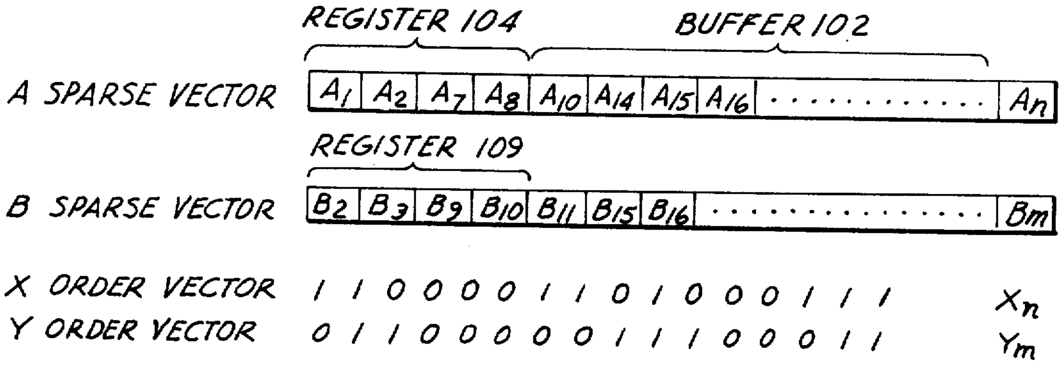
Figure 4:
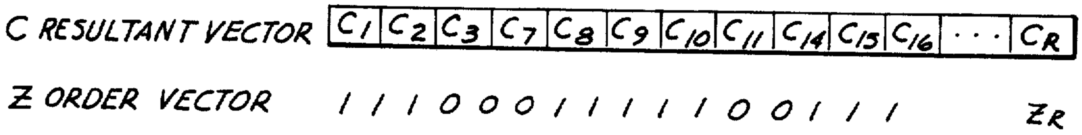
Figure 4:
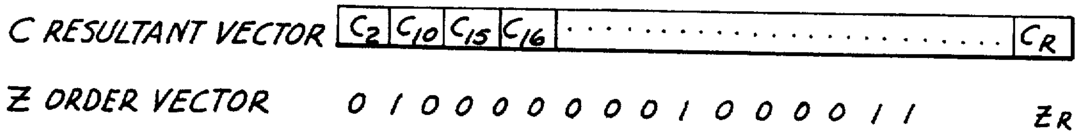

As heretofore explained, an operand sparse vector contains all non-zero operands of an ordinary operand vector. For purposes of illustration, the following explanation will concern the example where the operand vectors each contain sixteen operands ($A_1$–$A_{16}$ and $B_1$–$B_{16}$, respectively), and the A operands $A_3$, $A_4$, $A_5$, $A_6$, $A_9$,$A_{11}$, $A_{12}$, and $A_{13}$ each represent a zero value (thereby leaving the A sparse vector of $A_1$, $A_2$, $A_7$, $A_8$, $A_{10}$, $A_{14}$, $A_{15}$, and $A_{16}$). Also, it will be assumed that the B operands $B_1$, $B_4$, $B_5$, $B_6$, $B_7$, $B_8$, $B_{12}$, $B_{13}$, and $B_{14}$ each represent a zero value (thereby leaving the B sparse vector of $B_2$, $B_3$, $B_9$, $B_{10}$, $B_{11}$, $B_{15}$ and $B_{16}$). As explained in the aforementioned copending application, buffers 102 and 107 align the A and B operands so that the first-arriving A operand ($A_1$) is aligned with the first-arriving B operand ($B_2$), the second-arriving A operand ($A_2$) is aligned with the second-arriving B operand ($B_3$), the third-arriving A operand ($A_7$) is aligned with the third-arriving B operand ($B_9$), and so on. As explained in the aforementioned copending application, registers 104 and 109 are each capable of storing four operands, so operands $A_1$, $A_2$, $A_7$ and $A_8$ will be stored in register 104, operands $B_2$, $B_3$, $B_9$ and $B_{10}$ will be stored in register 109, and the remaining operands will be stored in buffers 102 and 107. Therefore, the A and B sparse vectors are aligned as shown in FIG. 4.

Although the present example is of operand vectors having sixteen terms (with the A operand sparse vector having eight terms and the B operand sparse vector having seven terms), it is to be understood that the example is a very simple example chosen to illustrate the principles of operation and that ordinarily the vectors may contain several thousand operands. For small vectors, such as the example given, it might actually be more convenient to handle the operation in another fashion, such as that explained in the aforementioned copending application. Further, the example of a sixteen operand vector eliminates the details of explanation as to how significantly long vectors (i.e., longer than about 32 terms) are handled, but the manner of handling such longer vectors will become more readily apparent hereinafter. Therefore, it is cautioned that the simple example of a 16 operand vector is set forth herein as an example only, and is described for purposes of convenience in explanation; the refinements of operation for handling longer vectors will become apparent hereinafter.

The X order vector includes a plurality of bits equal in number to the number of operands in the entire A operand vector. A binary one bit in the X order vector indicates that the corresponding A operand has a non-zero value, whereas a binary zero bit in the X order vector indicates that the corresponding A operand has a zero value (and therefore is not present in the A sparse vector). Similarly, the Y order vector includes a plurality of bits of binary one and zero values depending upon the value of the corresponding B operand. Therefore, for the example given where the A operand vector includes 16 terms and the B operand vector includes 16 terms, the X and Y order vectors will each have 16 bits arranged as shown in FIG. 4. Thus, in FIG. 4, the X order vector has binary ones at its first, second, seventh, eighth, tenth, fourteenth, fifteenth and sixteenth positions (reading left-to-right) corresponding to the non-zero valued A operands, and the Y order vector has binary ones at its second, third, ninth, tenth, eleventh, fifteenth and sixteenth positions (reading left-to-right) corresponding to the non-zero valued B operands.

The X and Y order vectors are read from memory via channels 111 and 114 and are stored in buffers 112 and 115, respectively. It will be understood that the X order vector and the A operand sparse vector may be read over the same data channel using the same read registers and, similarly, the Y order vector and the B operand sparse vector may be read over the same data channel using the same read registers. In such case, switching means (not shown) may be provided for channelling the A operands to buffer 102, the X bits to buffer 112, the B operands to buffer 107 and the Y bits to buffer 115. (It will be understood that buffers 102 and 107 can store up to 32 operands while buffers 112 and 115 can store up to 1,024 bits.) Scale registers 117 and 122 are 16-bit registers. The first sixteen bits of the X and Y order vectors (in this case $X_1$–$X_{16}$ and $Y_1$–$Y_{16}$) are forwarded to scale registers 117 and 122, respectively. Scale register 117 forwards its entire sixteen-bit contents to left shift network 118 which in turn forwards the first bit ($X_1$) to set (or reset) flip-flop 120 and left shifts the remaining fifteen bits and returns them to scale register 117 where they occupy the first fifteen bit positions (leaving the sixteenth bit position vacant). If the first bit of the X order vector is a binary one (which it is in the example) X flip-flop 120 is set to provide a gating signal to operand shift register 104 via channel 130. Upon the second pass of the order vector through the left shift network, the second bit ($X_2$), occupying the first position, sets (or resets) flip-flop 120 and the remaining bits are left shifted so that the third bit will occupy the first position in register 117. Operand shift registers 104 and 109 normally provide a machine zero output on channels 138 and 139, except when gated by a respective flip-flop 120 or 125. Therefore, when one register 104 or 109 is gated (and the other is not), the one outputs an operand while the other continues to output a machine zero. The process continues until all bits have been processed and register 117 is empty, at which time buffer 112 will forward the next 16 order bits of the X order vector to register 117 so the process can continue.

Similarly, scale register 122 and left shift network 123 will step through the Y order bits to set (and reset) Y flip-flop 125 to provide gating signals to operand shift register 109 via channel 131. As an example, the X and Y flip-flops 120 and 125 may be monostable multivibrators adapted to set to provide a gate signal upon receipt of a binary one bit, and to reset upon receipt of a binary zero bit.

OR gate 126 operates to pass the OR result of the X and Y order bits. Thus, in the example, OR gate 126 will pass 1110001111100111. (Note that bits 4, 5, 6, 11 and 12 are zeros.) When the first bit is a zero (which may occur upon a coincidence of zeros in the X and Y order vectors), normalize count network 127 counts the number of zeros which precede the next binary 1 and operates shift count register 128 to provide an output to both left shift networks 118 and 123 to shift the counts therein by the same number. Therefore, during the fourth pass (when the leading bit is zero), the normalize count network counts the number of zero bits (in this case three) preceding the next one bit and provides that count to register 128. The result of this is that the bits in networks 118 and 123 are shifted three positions so that upon return to registers 117 and 122 the X and Y order vectors will have their next ($X_7$ and $Y_7$) bits in the forward positions. Similarly, at $X_{12}$, $Y_{12}$ network 127 operates to pass a count of two to shift networks 118 and 123 to again left shift them to skip $X_{12}$, $X_{13}$, $Y_{12}$ and $Y_{13}$.

From the foregoing, it is evident that the X and Y flip flops 120 and 125 are set and reset in accordance with the following tabel:

| Flip-flop 120 | Vector | Flip-flop 125 | Vector |
|---|---|---|---|
| 1 | $X_1$ | 0 | $Y_1$ |
| 1 | $X_2$ | 1 | $Y_2$ |
| 0 | $X_3$ | 1 | $Y_3$ |
| 1 | $X_7$ | 0 | $Y_7$ |
| 1 | $X_8$ | 0 | $Y_8$ |
| 0 | $X_9$ | 1 | $Y_9$ |
| 1 | $X_{10}$ | 1 | $Y_{10}$ |
| 0 | $X_{11}$ | 1 | $Y_{11}$ |
| 1 | $X_{14}$ | 0 | $Y_{14}$ |
| 1 | $X_{15}$ | 1 | $Y_{15}$ |
| 1 | $X_{16}$ | 1 | $Y_{16}$ |

The gating signals from flip-flops 120 and 125 gate registers 104 and 109 to pass one opeand over channels 138 and 139, respectively, to the data interchange and arithmetic portions of the computer (not shown). As heretofore explained, registers 104 and 109 (and buffers 102 and 107) contain operands as shown in FIG. 4. Therefore, referring to the foregoing table and to FIG. 4, during the first minor cycle of the computer, flip-flop 120 provides a gating output to register 104 to process the first A operand ($A_1$) onto channel 138. However, flip-flop 125 is reset, so no gate signal is provided to register 109 so the first B operand is not passed. Instead, register 109 passes machine zero as heretofore explained. The next A operand ($A_2$) steps into the forward position of register 104 so that during the next minor cycle both flip-flops 120 and 125 gate registers 104 and 109 to pass $A_2$ and $B_2$ . Likewise, during the next minor cycle flip-flop 125 gates register 109 to pass $B_3$ (register 104 passes a machine zero due to the zero output from flip-flop 120). During the next minor cycle flip-flop 120 gates register 104 to pass $A_7$, and so on through the entire vectors. Therefore, the data on channels 138 and 139 will be streamed as follows:

| Minor Cycle | Channel 138 | Channel 139 |
|---|---|---|
| 1 | $A_1$ | 0 |
| 2 | $A_2$ | $B_2$ |
| 3 | 0 | $B_3$ |
| 4 | $A_7$ | 0 |

-continued

| Minor Cycle | Channel 138 | Channel 139 |
|---|---|---|
| 5 | $A_8$ | 0 |
| 6 | 0 | $B_9$ |
| 7 | $A_{10}$ | $B_{10}$ |
| 8 | 0 | $B_{11}$ |
| 9 | $A_{14}$ | 0 |
| 10 | $A_{15}$ | $B_{15}$ |
| 11 | $A_{16}$ | $B_{16}$ |

Multiplexer 132 receives signals from buffers 102, 107, 112 and 115 to forward requests for more vector data of the A, B, X and Y vectors to the appropriate buffer. Therefore, should one of the buffers run low on its contents, a signal denoting that fact is transmitted to the storage access control (not shown) via multiplexer 132 to call up more vector data for that buffer. As explained in the aforementioned copending application, the storage access control is capable of supplying data to any one of read registers 100, 105, 110 and 113 from a single group of memory banks during any one memory cycle. Therefore, it is probable that each buffer 102, 107, 112 and 115 will contain different amounts of their respective vectors at any one time. Consequently, it is probable the multiplexer will be honoring data requests for different vectors during non-conflicting times. Should, however, a demand for data be requested by two or more buffers, the multiplexer will honor one of them, and the process will temporarily halt due to the absence of a needed vector. For details of the alignment and timing aspects of the buffering, reference may be had to the aforementioned copending application.

The arithmetic unit of the computer utilizes the operands appearing on channels 138 and 139 to generate resultants in accordance with the particular arithmetic function being performed. For example, in the addition mode, the arithmetic unit will perform $A_1+0 = C_1$, $A_2+B_2=C_2$, $0+B_3=C_3$, $A_7+0 =C_7$, and so on. In the subtract mode, the arithmetic unit will perform $A_1 0=C_1$, $A_2 B_2=C_2$, $0 B_3=C_3$, $A_7 0=C_7$, and so on. In the multiply mode, the arithmetic unit will perform $A_1 \cdot 0=C_1$, $A_2 \cdot B_2=C_2$, $0 \cdot B_3=C_3$, $A_7 \cdot 0=C_7$, and so on, and in the divide mode the arithmetic unit will perform $A_1/0=C_1$, $A_2/B_2=C_2$, $0/B_3=C_3$, $A_7/0=C_7$, and so on. it will be appreciated that multiplication involving a zero operand will yield a zero resultant, that dividing involving a zero divisor will yield an infinity resultant, and that dividing involving a zero dividend will yield a zero resultant. As will be more fully explained hereinafter, particularly in connection with FIG. 2, such operations are not permissible and all will be zeroed out, regardless of any computation performed by the arithmetic unit.

Figure 2:
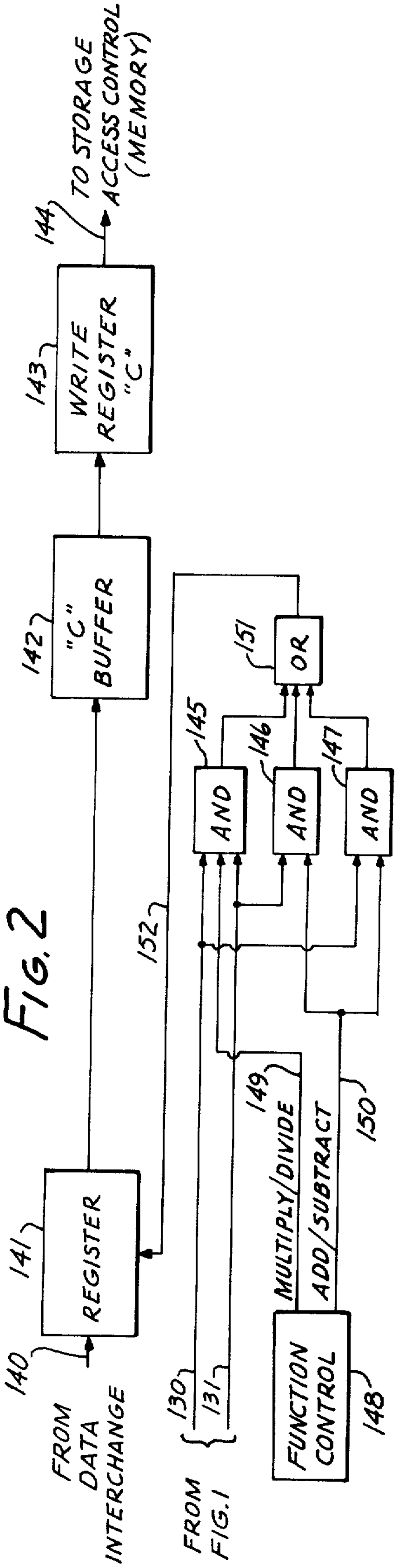
FIG. 2 is a block circuit diagram of apparatus for controlling resultant sparse vectors in accordance with the presently preferred embodiment of the present invention.

Referring particularly to FIG. 2, there is illustrated apparatus for channelling resultants to the storage access control or memory of a computer from the data interchange or arithmetic portions of the computer. The C resultants are received from the data interchange via channel 140 by register 141. They are then forwarded to buffer 142 (which may contain up to 128 resultants) and thence forwarded to write register 143 for processing via channel 144 to the storage access control and memory of the computer. The details of the buffering and timing controls thereof are more fully explained in the aforementioned copending application. The X and Y gate signals from flip-flops 120 and 125 in FIG. 1 are forwarded via channels 130 and 131 to AND gates 145, 146 and 147. Particularly, gating signals from X flip-flop 120 are forwarded via channel 130 to one AND input of AND gates 145 and 147, and gating signals from Y flip-flop 125 are forwarded via channel 131 to an AND input of AND gates 145 and 146. Function control 148 provides gate outputs via channels 149 and 150. In the case of either multiplication or division functions, a gate output is provided via channel 149 to a third AND input of AND gate 145. In the case of either an add or subtract function, a gate signal is provided via gate 150 to both AND gates 146 and 147. It will be appreciated, therefore, that in either the multiply or divide mode, a gate output from both flip-flops 120 and 125 in FIG. 1 are necessary to operate AND gate 145 to provide a signal output therefrom. Likewise, it will be appreciated that in either the add or subtract mode a gate output from either (or both) of flip-flops 120 and/or 125 will selectively operate one or the other (or both) of AND gates 146 and 147. The outputs of AND gates 145, 146 and 147 provide inputs to OR gate 151. It will therefore be appreciated that OR gate 151 provides an output via channel 152 to register 141 only when either of the operands is present and function control 148 is in its add or subtract mode, or when both operands are present and the function control is in its multiply or divition mode. Therefore, an output is provided from OR gate 151 only in the case of a permissible operation of the arithmetic unit. Therefore, in those cases involving a zero-valued multiplier, divisor or dividend, an output will not appear from OR gate 151 on channel 152.

The gating signal on channel 152 gates register 141 to permit passage of the applicable resultant to buffer 142 for subsequent storage in memory. Therefore, in those cases where a non-permissible calculation was accomplished by the arithmetic unit, register 141 is not gated so that the non-permissible resultant is not stored. Instead, such non-permissible resultants are merely discarded.

In the example given above, and from the foregoing description, it is evident that register 141 is gated, during either an add or subtract function, to pass resultants $C_1$, $C_2$, $C_3$, $C_7$, $C_8$, $C_9$, $C_{10}$, $C_{11}$, $C_{14}$, $C_{15}$ and $C_{16}$. However, in either the multiply or divide mode, register 141 is gated to pass resultants $C_2$, $C_{10}$, $C_{15}$ and $C_{16}$; the other resultants being non-permissible resultants discarded by register 143.

It has previously been assumed that resultants having a value of zero or infinity, derived from a multiply or divide function, are non-permissible resultants. It will be appreciated, however, that the non-storage of such resultants gives rise to the presumption that they equal machine zero. While such presumption may be valid in most cases, if it is desirable to determine which resultants may have an infinity value, the individual divisors and dividends may be examined through comparison circuits in other portions of the computer for insertion at appropriate locations in memory.

Figure 3:
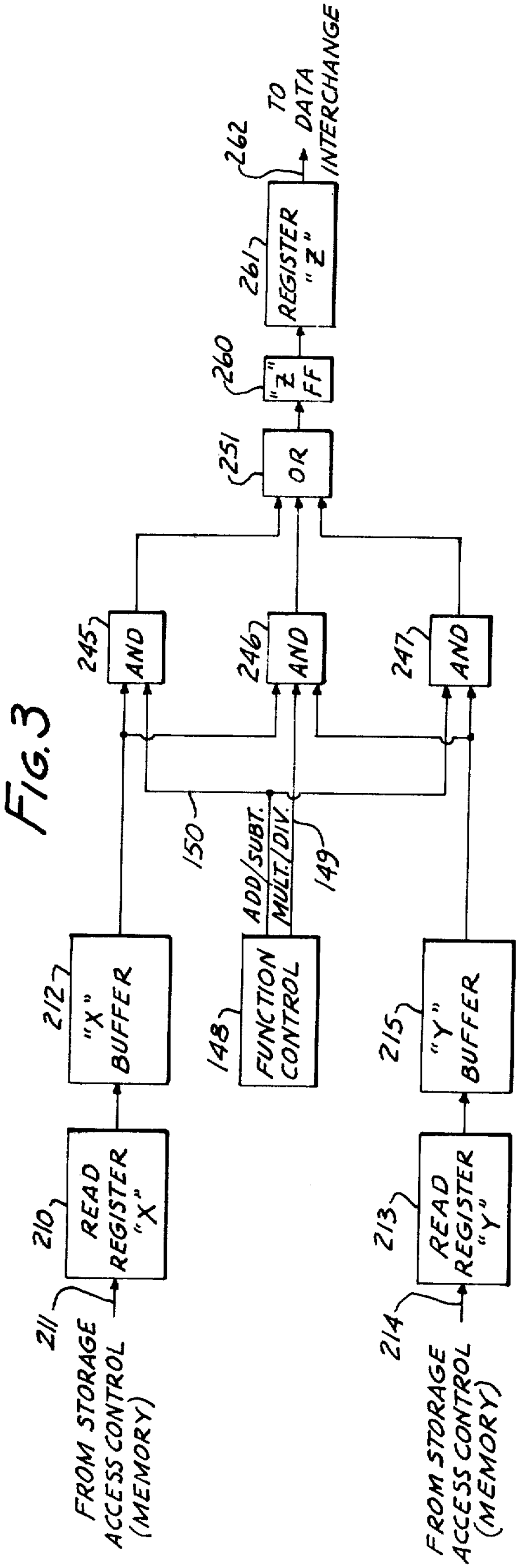
FIG. 3 is a block circuit diagram of apparatus for generating resultant order vectors according to the present invention.

From the foregoing description, it has been explained how sparse vectors may be logically gated by order vectors to perform arithmetic operations to derive sparse resultant vectors for storage in memory. However, such sparse resultant vectors are not altogether useful without a resultant order vector. FIG. 3 illustrates the apparatus for generation of the resultant order vector Z which, like the operand order vectors, consists of a plurality of bits in which binary ones indicate non-zero resultants of the resultant vector and binary zeros indicate zero-valued resultants.

As shown in FIG. 3, read register 210 receives the X order vector from the storage access control and memory of the computer via channel 211 and forwards that information to X buffer 212. Similarly, read register 213 receives the Y order vector from the storage access control and memory of the computer via channel 214 and forwards that information to buffer 215. The bits are sequentially forwarded from buffer 212 and 215 to AND gates 245, 246 and 247. Function control 148 (which may be the same function control illustrated and described in connection with FIG. 2) forwards a gate signal indicative of either a multiply or divide function via channel 149 or an add or subtract function via channel 150. The output from function control 148 indicative of muliply and divide function is forwarded via channel 149 to AND gate 246, which receives its other AND inputs from both buffers 212 and 215. Function control 148 forwards gating signals indicative of add and subtract functions via channel 150 to AND gate 245 and 247. The outputs of AND gates 245, 246 and 247 are forwarded through OR gate 251 and thereafter to set or reset Z monostable multivibrator (flip-flop) 260. The output of flip-flop 260 is connected to output register 261 for output via channel 262 to the data interchange.

As the X and Y vectors are streamed through buffers 212 and 215, respectively, they are forwarded to the respective AND gates to set and reset flip-flop 260 through OR gate 251. For example, in either an add or subtract mode, for each binary one appearing in either the X or Y vector, the respective AND gate 245 or 247 will be operated to operate OR gate 251 to set flip-flop 260 to provide a binary one output to register 261. Conversely, in either the multiply or divide mode, if both the X and Y bits are binary ones, AND gate 246 is operated to operate OR gate 251 to set flip-flop 260 thereby providing a binary 1 output to register 261. In all other cases, flip-flop 260 is reset to provide a binary zero output to register 261. The Z order vector is thereby formed and forwarded to the data interchange where it may be channelled over channel 140 through register 141 to memory. FIG. 5 illustrates the C resultant sparse vector and Z order vector for the add or subtract example, while FIG. 6 illustrates the C resultant sparse vector and Z order vector for the multiply and divide examples.

It will be appreciated that many of the portions of FIG. 3 are substantially identical to portions of FIGS. 1 and 2. Thus, for simplicity of circuitry, read registers 210 and 213 may be read registers 110 and 113 in FIG. 1, and buffers 212 and 215 may be buffers 112 and 115 in FIG. 1. AND gates 245, 246 and 247 may be AND gates 145, 146 and 147 in FIG. 2 and OR gate 251 may be OR gate 151 in FIG. 2, but for similarity of operation it is preferred that they be distinct because the AND and OR gates in FIG. 3 are preferably 16-bit gates, whereas in FIG. 2 they are preferably 1-bit gates. However, if such an identity of circuitry is utilized, it may be necessary to generate the Z order vector during a second iteration of the data.

The present invention thus provides apparatus for aligning sparse vectors to perform arithmetic computations thereon. Further, the invention provides apparatus for condensing resultant vectors for minimizing storage space necessary to store resultants. As shown particularly in FIGS. 5 and 6 substantial savings of memory space can be achieved by storing only non-zero operands and resultants together with the necessary order vector. Upon subsequent use of the resultants (for example as operands in a subsequent operation) the vectors may be utilized in the same manner. With apparatus according to the present invention, it is possible to store vectors having a great number of quantities in a minimum space within the computer memory and, it may also be possible to reduce computation time in connection with the sparse vectors, particularly if the vector includes a large number of components having a predetermined (e.g. zero) value.

This invention is not to be limited by the embodiment shown in the drawings and described in the description, which is given by way of example and not of limitation, but only in accordance with the scope of the appended claims.

What is claimed is:

1. Apparatus for aligning corresponding operands of first and second operand sparse vectors wherein a first order vector comprises a first string of successive bits and a second order vector comprises a second string of successive bits, the bits of said order vectors each having a first binary value whenever the corresponding term of a corresponding operand vector represents a non-zero value and having a second binary value whenever the corresponding term of the corresponding operand vector represents a zero value, said apparatus comprising: logic means for processing said first and second order vectors to provide first and second gate signals, said logic means including network means for sequentially shifting successive bits of said first and second order vectors, first generating means connected to said network means for generating said first gate signal whenever the network means shifts a bit having said first binary value in said first order vector to said first generating means, and second generating means connected to said network means for generating said second gate signal whenever the network means shifts a bit having said first binary value in said second order vector to said second generating means; and gatable register means for storing operands of said first and second sparse vectors, said register means having an output and being responsive to a first gate signal to supply an operand from said first sparse vector to said output and being responsive to a second gate signal to supply an output from said second sparse vector to said output.

2. Apparatus according to claim 1 wherein said network means includes first register means for storing at least a portion of said first order vector and second register means for storing at least a portion of said second order vector, shift means for sequentially shifting the contents of said first and second register means, said first generating means providing said first gate signal when a bit having said first binary value is in a predetermined position in said first register means, and said second generating means providing said second gate signal when a bit having said first binary value is in a predetermined position in said second register means.

3. Apparatus according to claim 2, wherein said shift means includes a shift network.

4. Apparatus according to claim 2 further including coincidence means responsive to a coincidence of bits in said first and second order vectors having said second binary value, counter means for counting the number of successive coincident bits having said second binary value, said shift means being responsive to the count from said counter means for additionally shifting the contents of said first and second register means by a number of bits equal to said count.

5. Apparatus according to claim 4 wherein said coincidence means includes OR gate means connected to said first and second register means for passing a bit stream having a plurality of bits, the bits in said bit stream having a first binary value if the corresponding bit in either said first or second order vector has said first binary value and the bits in said bit stream having a second binary value if the corresponding bits in both said first and second order vectors have said second binary value, said counter means including normalize count means for counting the number of successive bits in said bit stream having said second binary value, and third register means for storing a signal representative of said count.

6. Apparatus according to claim 5 wherein said normalize count means is operable if the first bit in said bit stream has said second binary value.

7. Apparatus according to claim 4 further including calculator means connected to said output, receiving means for receiving a resultant sparse vector from said calculator means, said resultant sparse vector including a plurality of resultants derived from said first and second operands, function control means providing a third gate signal indicative that said resultants are the result of either a multiplication or division function, and gate means responsive to a coincidence of said first, second and third gate signals for processing selected resultants from said receiving means to the memory of a computer.

8. Apparatus according to claim 7 wherein said function control means further provides a fourth gate signal indicative that said resultants are the result of either an add or subtract function, said gate means being responsive to a coincidence of said fourth gate signal and either of said first and second gate signals for processing selected resultants from said receiving means to said memory.

9. Apparatus according to claim 2 further including calculator means connected to said output, receiving means for receiving a resultant sparse vector from said calculator means, said resultant sparse vector including a plurality of resultants derived from said first and second operands, function control means providing a third gate signal indicative that said resultants are the result of either a multiplication or division function, and gate means responsive to a coincidence of said first, second and third gate signals for processing selected resultants from said receiving means to the memory of a computer.

10. Apparatus according to claim 9 wherein said function control means further provides a fourth gate signal indicative that said resultants are the result of either an add or subtract function, said gate means being responsive to a coincidence of said fourth gate signal and either of said first and second gate signals for processing selected resultants from said receiving means to said memory.

11. Apparatus according to claim 1 further including calculator means connected to said output, receiving means for receiving a resultant sparse vector from said calculator means, said resultant sparse vector including a plurality of resultants derived from said first and second operands, function control means providing a third gate signal indicative that said resultants are the result of either a multiplication or division function, and gate means responsive to a coincidence of said first, second and third gate signals for processing selected resultants from said receiving means to the memory of a computer.

12. Apparatus according to claim 11 wherein said function control means further provides a fourth gate signal indicative that said resultants are the result of either an add or subtract function, said gate means being responsive to a coincidence of said fourth gate signal and either of said first and second gate signals for processing selected resultants from said receiving means to said memory.

13. Apparatus according to claim 12 wherein said gate means includes first AND gate means responsive to a coincidence of said first, second and third gate signals to provide a first AND signal, second AND gate means responsive to a coincidence of said first and fourth gate signals to provide a second AND signal, third AND gate means responsive to a coincidence of said second and fourth gate signals to provide a third AND signal, and OR gate means responsive to any of said first, second and third AND signal for controlling said receiving means.

14. Apparatus according to claim 12 further including second logic means responsive to said first and second order vectors and to said third and fourth gate signals for establishing a third order vector, said third order vector comprising a plurality of bits, a bit of said third order vector having a first binary value upon the coincidence of a third gate signal and a bit in each of said first and second order vectors having said first binary value or upon the coincidence of a fourth gate signal and a bit in either of said first and second order vectors having said first binary value, a bit of said third order vector having a second binary value upon the coincidence of a third gate signal and a bit in either of said first and second order vectors having said second binary value or upon the coincidence of said fourth gate signal and a bit in each of said first and second order vectors having said second binary value.

15. Apparatus according to claim 14 wherein said second logic means includes first AND gate means responsive to a coincidence of said third gate signal and bits having said first binary value in said first and second order vectors to provide a first AND signal, second AND gate means responsive to a coincidence of said fourth gate signal and a bit in said first order vector having said first binary value to provide a second AND signal, third AND gate means responsive to a coincidence of said fourth gate signal and a bit in said second order vector having said first binary value to provide a third AND signal, OR gate means responsive to any of said first, second and third AND signals to provide a set signal, and means connected to said OR gate means for generating the bits of said third order vector such that a generated bit will have a first binary value whenever a set signal is provided by said OR gate means and will have a second binary value whenever a set signal is not provided by said OR gate means.

16. Apparatus for processing data between the memory and calculator portions of a computer wherein the memory contains a first sparse vector comprising a plurality of first operands and a second sparse vector comprising a plurality of second operands, said first operands each representing respective ones of those terms of a corresponding first operand vector which do not represent a predetermined value and said second operands each representing respective ones of those terms of a corresponding second operand vector which do not represent said predetermined value, said memory further containing a first order vector comprising a first plurality of successive bits and a second order vector comprising a second plurality of bits, at least one bit of said first order vector corresponding to a respective term of said first operand vector and at least one bit of said second order vector corresponding to a respective term of said second operand vector, each bit of said first and second order vectors having a first binary value when the bit corresponds to a term not representing said predetermined value and each bit of said first and second order vectors having a second binary value when the bit corresponds to a term representing said predetermined value, said apparatus comprising: aligning means for aligning each successive first operand of said first sparse vector with each successive second operand of said second sparse vector; logic means responsive to the bits of said first and second order vectors for providing first and second gate signals; and gate means responsive to said first gate signal for processing an operand of said first sparse vector from said aligning means to said calculator portion and responsive to said second gate signal for processing an operand of said second sparse vector from said aligning means to said calculator portion.

17. Apparatus according to claim 16 wherein said logic means includes first register means for storing at least a portion of said first order vector and second register means for storing at least a portion of said second order vector, shift means for sequentially shifting the contents of said first and second register means, first generating means providing said first gate signal when a bit having said first binary value is in a predetermined position in said first register means, and second generating means providing said second gate signal when a bit having said first binary value is in a predetermined position in said second register means.

18. Apparatus according to claim 17, wherein said shift means includes a shift network.

19. Apparatus according to claim 17 further including coincidence means responsive to a coincidence of bits in said first and second order vectors having said second binary value, counter means for counting the number of successive coincident bits having said second binary value, said shift means being responsive to the count from said counter means for additionally shifting the contents of said first and second register means by a number of bits equal to said count.

20. Apparatus according to claim 19 wherein said coincidence means includes OR gate means connected to said first and second register means for passing a bit stream having a plurality of bits, the bits in said bit stream having a first binary value if the corresponding bit in either said first or second order vector has said first binary value and the bits in said bit stream having a second binary value if the corresponding bits in both said first and second order vectors have said second binary value, said counter means including normalize count means for counting the number of successive bits in said bit stream having said second binary value, and third register means for storing a signal representative of said count.

21. Apparatus according to claim 20 wherein said normalize count means is operable if the first bit in said bit stream has said second binary value.

22. Apparatus according to claim 16 further including receiving means for receiving a resultant sparse vector from said calculator portion of the computer, said resultant sparse vector including a plurality of resultants derived from said first and second operands, function control means providing a third gate signal indicative that said resultants are the result of either a multiplication or division function, and gate means responsive to a coincidence of said first, second and third gate signals for processing selected resultants from said receiving means to said memory.

23. Apparatus according to claim 22 wherein said function control means further provides a fourth gate signal indicative that said resultants are the result of either an add or subtract function, said gate means being responsive to a coincidence of said fourth gate signal and either of said first and second gate signals for processing selected resultants from said receiving means to said memory.

24. Apparatus according to claim 23, wherein said gate means includes first AND gate means responsive to a coincidence of said first, second and third gate signals to provide a first AND signal, second AND gate means responsive to a coincidence of said first and fourth gate signals to provide a second AND signal, third AND gate means responsive to a coincidence of said second and fourth gate signals to provide a third AND signal, and OR gate means responsive to any of said first, second and third AND signal for controlling said receiving means.

25. Apparatus according to claim 24 wherein said logic means includes first register means for storing at least a portion of said first order vector and second register means for storing at least a portion of said second order vector, shift means for sequentially shifting the contents of said first and second register means, first generating means providing said first gate signal when a bit having said first binary value is in a predetermined position in said first register means, and second generating means providing said second gate signal when a bit having said first binary value is in a predetermined position in said second register means.

26. Apparatus according to claim 25 further including coincidence means responsive to a coincidence of bits in said first and second order vectors having said second binary value, counter means for counting the number of successive coincident bits having said second binary value, said shift means being responsive to the count from said counter means for additionally shifting the contents of said first and second register means by a number of bits equal to said count.

27. Apparatus according to claim 22 wherein said logic means includes first register means for storing at least a portion of said first order vector and second register means for storing at least a portion of said second order vector, shift means for sequentially shifting the contents of said first and second register means, first generating means providing said first gate signal when a bit having said first binary value is in a predetermined position in said first register means, and second generating means providing said second gate signal when a bit having said first binary value is in a predetermined position in said second register means.

28. Apparatus according to claim 27 further including coincidence means responsive to a coincidence of bits in said first and second order vectors having said second binary value, counter means for counting the number of successive coincident bits having said second binary value, said shift means being responsive to the count from said counter means for additionally shifting the contents of said first and second register means by a number of bits equal to said count.

29. Apparatus according to claim 23 further including second logic means responsive to said first and second order vectors and to said third and fourth gate signals for establishing a third order vector, said third order vector comprising a plurality of bits, a bit of said third order vector having a first binary value upon the coincidence of a third gate signal and a bit in each of said first and second order vectors having said first binary value or upon the coincidence of a fourth gate signal and a bit in either of said first and second order vectors having said first binary value, a bit of said third order vector having a second binary value upon the coincidence of a third gate signal and a bit in either of said first and second order vectors having said second binary value or upon the coincidence of said fourth gate signal and a bit in each of said first and second order vectors having said second binary value.

30. Apparatus according to claim 29 wherein said second logic means includes first AND gate means responsive to a coincidence of said third gate signal and bits having said first binary value in said first and second order vectors to provide a first AND signal, second AND gate means responsive to a coincidence of said fourth gate signal and a bit in said first order vector having said first binary value to provide a second AND signal, third AND gate means responsive to a coincidence of said fourth gate signal and a bit in said second order vector having said first binary value to provide a third AND signal, OR gate means responsive to any of said first, second and third AND signals to provide a set signal, and means connected to said OR gate means for generating the bits of said third order vector such that a generated bit will have a first binary value whenever a set signal is provided by said OR gate means and will have a second binary value whenever a set signal is not provided by said OR gate means.

* * * * *